(12) United States Patent
Breynaert et al.

(10) Patent No.: US 7,045,926 B2
(45) Date of Patent: May 16, 2006

(54) COMMUTATOR FOR AN ELECTRIC MOTOR

(75) Inventors: Francois Breynaert, Caen (FR); Hermann Yvetot, Saint Denis de Mere (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 0 days.

(21) Appl. No.: 11/063,257

(22) Filed: Feb. 22, 2005

(65) Prior Publication Data

US 2005/0200229 A1     Sep. 15, 2005

(30) Foreign Application Priority Data

Mar. 9, 2004  (FR) .................................. 04 02438

(51) Int. Cl.
*H02K 11/02* (2006.01)
*H02K 13/00* (2006.01)

(52) U.S. Cl. .................. 310/233; 310/220; 310/219
(58) Field of Classification Search ............... 310/220, 310/219, 233; 29/597
See application file for complete search history.

(56) References Cited

U.S. PATENT DOCUMENTS

| | | | | |
|---|---|---|---|---|
| 4,114,261 A | * | 9/1978 | Weiler | 29/846 |
| 4,318,449 A | * | 3/1982 | Salisbury | 180/65.4 |
| 5,400,496 A | * | 3/1995 | Kemmner et al. | 29/597 |
| 5,955,892 A | * | 9/1999 | Apland | 326/41 |
| 6,057,626 A | * | 5/2000 | Tanaka et al. | 310/233 |
| 6,584,673 B1 | * | 7/2003 | Schmidt | 29/597 |
| 6,710,500 B1 | * | 3/2004 | Wagner et al. | 310/233 |
| 2001/0048263 A1 | * | 12/2001 | Yokomizo et al. | 310/233 |
| 2002/0130584 A1 | * | 9/2002 | Kamiya et al. | 310/233 |
| 2002/0180300 A1 | * | 12/2002 | Inukai et al. | 310/233 |
| 2004/0066110 A1 | * | 4/2004 | Kageyama et al. | 310/233 |

FOREIGN PATENT DOCUMENTS

| | | |
|---|---|---|
| DE | 43 38 345 | 5/1995 |
| DE | 100 21 392 | 11/2001 |
| FR | 2 814 868 | 10/2000 |
| GB | 2 207 292 | 1/1989 |
| SU | 746790 B * | 7/1980 |
| WO | WO 00/33428 | 6/2000 |

OTHER PUBLICATIONS

French Search Report dated Oct. 11, 2004.

* cited by examiner

*Primary Examiner*—Darren Schuberg
*Assistant Examiner*—Erik Preston
(74) *Attorney, Agent, or Firm*—Carlson, Gaskey & Olds

(57) ABSTRACT

A commutator for an electric motor includes a support ring, a plurality of metal segments arranged around a circumference of the support ring, and a plurality of capacitors arranged between the support ring and the metal segments. Each capacitor is connected between two adjacent metal segments.

20 Claims, 1 Drawing Sheet

COMMUTATOR FOR AN ELECTRIC MOTOR

REFERENCE TO RELATED APPLICATION

This application claims priority to French patent application FR 04 02 438 filed Mar. 9, 2004.

BACKGROUND OF THE INVENTION

This invention relates generally to a commutator for an electric motor. In particular, the invention applies to an electric motor designed to drive motor vehicle equipment, such as a window regulator, a sunroof or a seat operation motor.

A commutator conventionally includes a commutator ring having a series of conductive segments around its circumference. The commutator ring is designed to be mounted integrally on a rotor shaft.

An electric motor generally includes a stator frame and a rotor mounted rotatably in the stator frame. The motor also includes windings that are integral with the rotor shaft, and each winding is electrically connected to two diametrically opposed segments of the commutator.

The commutator is generally mounted in a commutator housing that is integral with the stator. The commutator housing includes a housing support having a central opening designed to receive the commutator and to allow the rotor shaft to pass through the housing support. The housing support is made of an insulating material, for example a plastic material.

The commutator housing also includes at least one pair of brushes that are diametrically opposed relative to the commutator and designed to contact segments of the commutator during its rotation with the rotor shaft. The brushes are electrically connected to a supply of electric current.

When the motor is operating, as is known, the brushes are pressed against the commutator segments to successively supply the various windings corresponding to the various pairs of diametrically opposed segments with electric current while the commutator is rotating with the rotor.

Thus, when the motor is running, the brushes are successively in contact with the various rotating commutator segments. When a brush passes from one segment to the next, an electric arc can be generated between the brush and the segment which was previously in electrical contact with the brush. The creation of an electric arc is a known phenomenon when a switch is opened and when an electric current is passing therethrough. In the present case, the electric arc is due to the inductive effect of the winding previously powered by the brush.

The appearance of electric arcs or voltage spikes created between the commutator segments and the brushes can, firstly, damage these elements and, secondly, be a source of spurious signals which can interfere with other equipment of the motor or the vehicle.

Further, standards on radio interference set limits on spurious signal propagation from one piece of equipment to another. Thus, the International Special Committee on Radio Interference (CISPR) or other bodies have defined various classes corresponding to different levels of interference. Depending on the vehicle range, vehicle manufacturers are obliged to comply with one of the various classes.

Conventionally, the electric arc phenomenon can be compensated for by inserting an LC (inductive-capacitive) type circuit that constitutes an interference suppressor filter between the two supply brushes of the commutator housing. The filter must be implemented on the commutator housing, which complicates production of the commutator housing and generally requires manual intervention by an operator. This increases motor production costs.

Additionally, the LC filter does not make it possible to sufficiently filter out induced spurious signals. As a result, motors fitted with these devices do not meet the highest radioelectric interference standards.

French patent 2,814,868 discloses an electric motor commutator having a simplified interference suppressor device. Discharge circuits are provided on a printed circuit board of an annular shape that are sleeved onto the rotor shaft. Each pair of adjacent commutator segments is thus linked by an RC (resistance-capacitance) circuit of the printed circuit integral with the commutator ring. The discharge circuits make it possible to avoid most electric arc phenomena.

Nevertheless, such an interference suppressor device requires production and mounting of the printed circuit. Further, to operate correctly, it is necessary to provide a presser member to permanently keep the printed circuit lands in contact with the commutator segments.

This prior art solution consequently leads to increased manufacturing costs and creates a risk of incorrect operation due to poor contact.

There is consequently a need for a simplified commutator that makes it possible to achieve a high degree of interference suppression while guaranteeing reliable mounting and operation.

SUMMARY OF THE INVENTION

The invention provides a commutator for an electric motor including a support ring and a plurality of metal segments arranged on a circumference of the support ring. Each metal segment includes at least one tab member that extends on an axis perpendicular to the metal segment and that is resilient in a direction perpendicular to the axis. A plurality of capacitors are arranged between the support ring and the metal segments. Each capacitor includes two electrical terminals respectively soldered to a tab member of one of two adjacent metal segment.

Preferably, each tab member includes two arms forming a U-shaped clip, and each arm contacts a separate capacitor. Preferably, the tab members of the metal segments extend towards the support ring. Preferably, the metal segments are tooled together with the tab members. The tab members are preferably made of a metallized plastic material and are soldered or welded to the metal segments. In one embodiment, a plurality of capacitors are connected in parallel between a plurality of pairs of the adjacent metal segments.

A commutator housing for an electric motor is also provided. The commutator housing includes a support to receive a commutator and at least two brushes to contact the commutator segments. The support is not fitted with filters that are connected between the brushes.

Further features and advantages of the invention will become more clear from the detailed description that follows of some embodiments of the invention given solely by way of example and with reference to the attached drawings.

DETAILED DESCRIPTION OF THE PREFERRED EMBODIMENT

The commutator according to the present invention includes a support ring, a plurality of metal segments arranged on a circumference of the support ring, and a plurality of capacitors arranged between the support ring and the metal segments. Each capacitor is connected between two adjacent metal segments.

The capacitors connected between each metal segment provide excellent discharge of electric arcs generated. The solution is also compact and inexpensive because the capacitors employed are of the SMD (surface mount device) type. SMD components are less expensive than leaded components generally employed in the commutator housings of the prior art.

Figure 1:
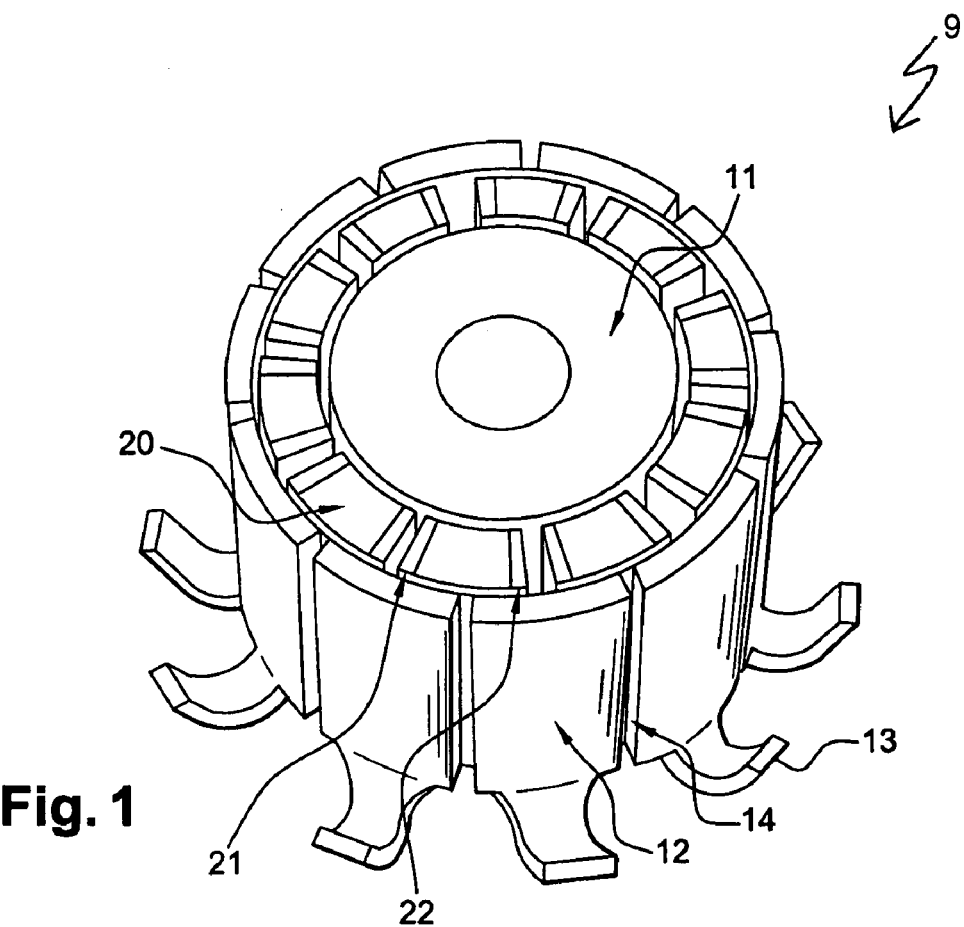
FIG. 1 is a diagram of a commutator according to the invention.

The commutator 9 of the invention will be described with reference to FIG. 1. The commutator 9 includes a support ring 11 of tubular shape that is made of an insulating material, for example a plastic material. The support ring 11 is surrounded by a plurality of metal segments 12 arranged over an entire circumference of the support ring 11. The support ring 11 may include notches that receive the metal segments 12. The notches can be designed to define a slot 14 between each metal segment 12. The metal segments 12 are consequently perfectly insulated from each other by the central support ring 11 and the slots 14. The support ring 11 can, for example, be molded in a plastic material directly with a suitable shape or can be machined. The metal segments 12 also include hook members 13 formed at one end of each metal segment 12. The hook members 13 allow subsequent connection of the metal segments 12 to rotor windings.

Capacitors 20 are arranged directly between the support ring 11 and the metal segments 12. Each capacitor 20 carries two electrical terminals 21 and 22, respectively, each soldered to one of two adjacent metal segments 12. The plurality of capacitors 20 are arranged in the commutator 9 according to the invention, and each capacitor 20 is connected between two adjacent metal segments 12.

The capacitors 20 can be of small value, around 470 nF for example, and are SMD type capacitors. Such components are readily accessible on the market and relatively inexpensive.

In one application, the plurality of capacitors 20 can be arranged in parallel and soldered to the same pair of adjacent metal segments 12. This increases discharge capacity between the commutator metal segments 12 while using low-value capacitors.

One embodiment will be described with reference to FIG. 2. Each metal segment 12 carries at least one tab member 15 extending along an axis 10 that is perpendicular to the metal segment 12. Each tab member 15 is resilient in a direction perpendicular to the axis 10, that is, in a direction substantially parallel to the two adjacent metal segments 12. The terminals 21 and 22 of the capacitors 20 are then each respectively soldered to a tab member 15 of one of the two adjacent metal segments 12.

The tab members 15 provide a certain degree of elasticity of the positioning of the capacitors 20 with respect to the metal segments 12. In effect, the soldered joints of the terminals 21 and 22 of the capacitors 20 rigidify the commutator support ring 11. When the connection leads of the rotor windings are subsequently soldered onto the hook members 13 of the metal segments 12, the soldered joints of the capacitors 20 or the actual capacitors 20 may break because the connected metal segment 12 may get slightly deformed by this operation. The discharge function is then no longer provided, and the motor does not satisfy the interference suppression standards imposed. Similarly, after assembling the commutator support ring 11 on the rotor shaft, the circumference of the commutator support ring 11 is frequently machined, which can also break the capacitors 20 or their soldered joints.

When the capacitors 20 are connected to the tab members 15 and no longer directly to the metal segments 12, they do not deform when the metal segments 12 are manipulated. This embodiment of the invention consequently makes it possible to reliably connect the capacitors 20 between each metal segment 12 of the commutator 9.

According to one embodiment, the tab members 15 each have two arms 16 and 17 that form a U-shaped clip. Each arm 16 and 17 of the tab member 15 is then soldered to a terminal 21 and 22, respectively, of a separate capacitor 20.

Each arm 16 and 17 can thus be resiliently forced to a different extent towards the other to provide the elasticity of tab member 15 in a first direction perpendicular to the axis 10 that is perpendicular to the metal segment 12. Each arm 16 and 17 can also twist to a certain degree to provide elasticity of the tab member 15 in another direction perpendicular to the axis 10.

Preferably, the tab members 15 project towards the support ring 11, that is, towards the inside of the commutator 9. The general appearance of a commutator 9 according to the invention is consequently not modified and its assembly onto a rotor shaft is not particularly modified.

The tab members 15 can be made of metal. They can be directly tooled as part of the metal segments 12 or can be produced separately and then soldered or welded onto the metal segments 12.

The tab members 15 can also be made of a plastic material which makes it possible to design more complex shapes, for example using molding techniques. The plastic material tab members 15 then must be metallized and soldered or welded to the metal segments 12. Any shape or any type of conducting material can be envisioned for the tab members 15, provided that an electrical connection can be provided between the metal segment 12 and the outer surface of the tab member 15.

In one example, the plurality of capacitors 20 in parallel can be arranged between a plurality of pairs of tab members 15 fitted to the same pair of adjacent metal segments 12. This allows the discharge capacitance between the commutator metal segments 12 to be increased while still using low-value capacitors.

The commutator 9 of the invention is designed to be placed in a commutator housing (not shown, but known) when the electric motor is being assembled. The housing is arranged in the stator of the electric motor (not shown, but known).

The various parts can be assembled as follows. The support ring 11 of the commutator 9 is slipped over a rotor shaft. The rotor shaft carries the usual windings. The windings are then each respectively connected to two diametrically opposite commutator metal segments 12. These connections with the rotor windings can employ the hook members 13 provided at the end of each metal segment 12.

The rotor shaft, carrying the commutator support ring 11 slipped over it, is placed in the stator and passes through an opening in the commutator housing. The commutator 9 is thus positioned on a support of the commutator housing. The commutator housing includes, as is known, at least two brushes designed to contact the commutator segments. The brushes supply the metal segments 12 with electric current and should consequently be well seated against the metal segments 12 to ensure good electrical conduction.

The commutator 9 according to the invention makes it possible, in particular, to employ a commutator housing that carries a support and which does not incorporate filters for connection between the two brushes. The commutator 9 consequently makes it possible to simplify the commutator housing and reduce the cost of the electric motor.

Figure 2:
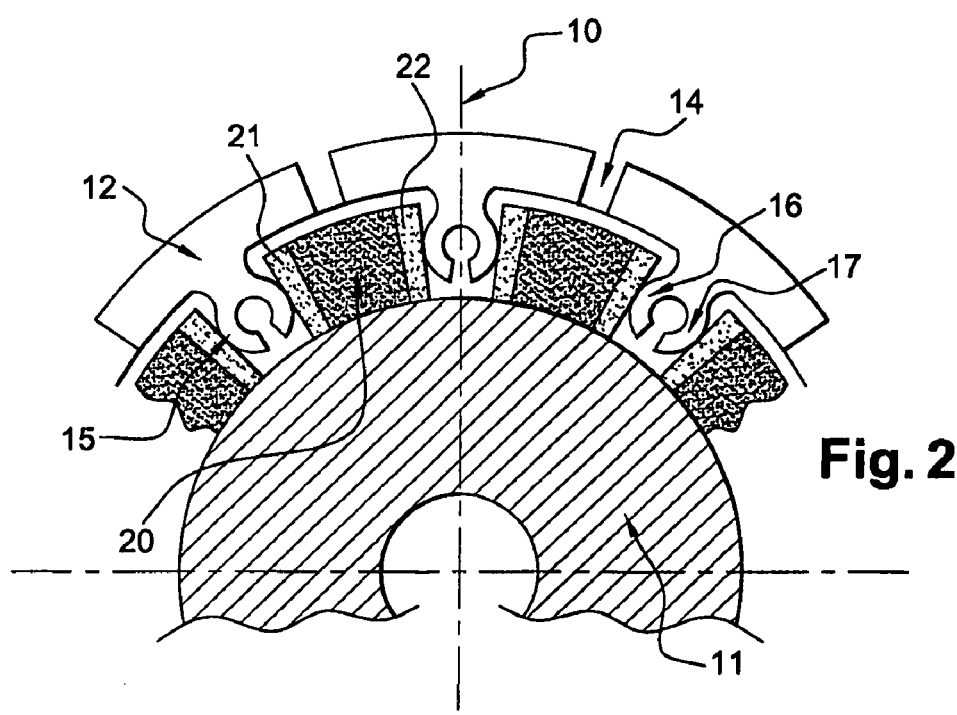
FIG. 2 is a diagram of the commutator according to an alternative embodiment.

In the specific case of the embodiment of FIG. 2, the operation of connecting the rotor windings to the commutator segments can be carried out with a reduced risk of damaging the capacitors 20 soldered between the tab members 15.

If a metal segment 12 deforms during the connection operation, the tab member 15 for the metal segment 12 can deform elastically with respect to the adjacent metal segments 12 to compensate for the deformation. Elastic deformation of the tab member 15 avoids applying stress on the capacitors 20 connected to the stressed metal segment 12, thereby avoiding all risk of deteriorating the capacitors 20 or their soldered joints.

Similarly, if assembly of the commutator 9 on the electric motor rotor shaft requires that the circumference of the commutator is machined, the metal segments 12 are subject to stresses which can be compensated for by elastically deforming the tab members 15 to avoid any deterioration of the capacitors 20 or their soldered joints.

Obviously, this invention is not limited to the embodiments described by way of example. Thus, the tab members 15 for the metal segments 12 have been illustrated in the form of U-shaped clips, but any other shape allowing resilience to be introduced in a direction parallel to a metal segment 12 can be employed without departing from the scope of the invention, such as a double hook shape.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A commutator for an electric motor comprising:
   a support ring having a circumference and an axis of symmetry;
   a plurality of metal segments arranged on the circumference of the support ring, each of the plurality of metal segments including a tab member extending on an axis substantially perpendicular to each of the plurality of metal segments, wherein the tab member is resilient in a direction substantially perpendicular to the axis and to the axis of symmetry of the support ring, and the plurality of metal segments comprises two adjacent metal segments; and
   a plurality of capacitors arranged between the support ring and the plurality of metal segments, wherein each of the plurality of capacitors includes two electrical terminals that are each respectively soldered to the tab member of one of the two adjacent metal segments.

2. The commutator according to claim 1, wherein the tab member of each of the plurality of metal segments includes two arms forming a U-shaped clip, each of the two arms contacting a separate capacitor.

3. The commutator according to claim 1, wherein the tab member of each of the plurality of the metal segments extends towards the support ring.

4. The commutator according to claim 1, wherein the plurality of metal segments are each tooled together with the tab member.

5. The commutator according to claim 1, wherein the plurality of capacitors are each connected in parallel between two of the plurality of metal segments.

6. The commutator according to claim 1, wherein the tab member extends radially.

7. The commutator according to claim 1, wherein the direction in which the tab member is resilient is substantially perpendicular to a radial direction of the commutator.

8. The commutator according to claim 1, wherein the tab member of each of the plurality of metal segments includes two arms that each contact a separate capacitor.

9. The commutator according to claim 8, wherein each of the two arms includes an opposing side portion, and the opposing side portions each contact the separate capacitor.

10. A commutator for an electric motor comprising:
    a support ring having a circumference and an axis of symmetry;
    a plurality of metal segments arranged on the circumference of the support ring, each of the plurality of metal segments including a tab member extending on an axis substantially perpendicular to each of the plurality of metal segments, wherein the tab member is resilient in a direction substantially perpendicular to the axis and to the axis of symmetry of the support ring, the plurality of metal segments comprises two adjacent metal segments, and the tab member is made of a metallized plastic material and is soldered or welded to one of the plurality of metal segments; and
    a plurality of capacitors arranged between the support ring and the plurality of metal segments, wherein each of the plurality of capacitors includes two electrical terminals that are each respectively soldered to the tab member of one of the two adjacent metal segments.

11. A commutator housing for an electric motor comprising:
    a support to receive a commutator including a support ring having a circumference and an axis of symmetry;
    a plurality of metal segments arranged on the circumference of the support ring, each of the plurality of metal segments including a tab member extending on an axis substantially perpendicular to each of the plurality of metal segments, wherein the tab member is resilient in a direction substantially perpendicular to the axis and to the axis of symmetry of the support ring, and the plurality of metal segments comprises two adjacent metal segments;
    a plurality of capacitors arranged between the support ring and the plurality of metal segments, wherein each of the plurality of capacitors includes two electrical terminals that are each respectively soldered to the tab member of one of the two adjacent metal segments; and
    at least two brushes to contact with the two adjacent metal segments, wherein the support is not fitted with filters connected between the at least two brushes.

12. The commutator housing according to claim 11, wherein the tab member of each of the plurality of metal segments includes two arms forming a U-shaped clip, each of the two arms contacting a separate capacitor.

13. The commutator housing according to claim 11, wherein the tab member of each of the plurality of the metal segments extends towards the support ring.

14. The commutator housing according to claim 11, wherein the plurality of metal segments are each tooled together with the tab member.

15. The commutator housing according to claim 11, wherein the tab member is made of a metallized plastic material and is soldered or welded to one of the plurality of metal segments.

16. The commutator housing according to claim 11, wherein the plurality of capacitors are each connected in parallel between two of the plurality of metal segments.

17. The commutator housing according to claim 11, wherein the tab member extends radially.

18. The commutator housing according to claim 11, wherein the direction in which the tab member is resilient is substantially perpendicular to a radial direction of the commutator.

19. The commutator housing according to claim 11, wherein the tab member of each of the plurality of metal segments includes two arms that each contact a separate capacitor.

20. The commutator housing according to claim 19, wherein each of the two arms includes an opposing side portion, and the opposing side portions each contact the separate capacitor.

* * * * *